United States Patent
Baroux

(10) Patent No.: US 8,439,776 B2
(45) Date of Patent: May 14, 2013

(54) HOCKEY STICK

(75) Inventor: Daniel Baroux, Halifax (CA)

(73) Assignee: BLH Technologies, Inc., Halifax, NS (CA)

( * ) Notice: Subject to any disclaimer, the term of this patent is extended or adjusted under 35 U.S.C. 154(b) by 0 days.

(21) Appl. No.: 13/536,812

(22) Filed: Jun. 28, 2012

(65) Prior Publication Data
US 2013/0005518 A1 Jan. 3, 2013

Related U.S. Application Data

(63) Continuation of application No. PCT/CA2011/050003, filed on Jan. 8, 2011.

(51) Int. Cl.
*A63B 59/14* (2006.01)

(52) U.S. Cl.
USPC .................................. 473/560; 473/562

(58) Field of Classification Search ......... 473/560–563, 473/549, 513
See application file for complete search history.

(56) References Cited

U.S. PATENT DOCUMENTS

| | | | | |
|---|---|---|---|---|
| 4,358,113 A | * | 11/1982 | McKinnon et al. | 473/561 |
| 4,553,753 A | * | 11/1985 | Gibbons | 473/560 |
| 5,549,947 A | | 8/1996 | Quigley et al. | |
| 5,688,571 A | | 11/1997 | Quigley et al. | |
| 5,860,878 A | * | 1/1999 | You | 473/549 |
| 5,863,269 A | * | 1/1999 | Filice | 473/562 |
| 5,879,250 A | * | 3/1999 | Tahtinen et al. | 473/561 |
| 5,888,601 A | | 3/1999 | Quigley et al. | |
| 5,967,913 A | * | 10/1999 | Sulenta | 473/560 |
| 6,113,508 A | | 9/2000 | Locarno et al. | |
| 2006/0247077 A1 | * | 11/2006 | Deetz | 473/513 |
| 2006/0293128 A1 | * | 12/2006 | Frischmon et al. | 473/560 |
| 2007/0270253 A1 | * | 11/2007 | Davis et al. | 473/513 |
| 2007/0275799 A1 | * | 11/2007 | Davis et al. | 473/560 |
| 2007/0287561 A1 | * | 12/2007 | Rigoli | 473/513 |
| 2011/0053715 A1 | * | 3/2011 | Rigoli | 473/513 |

FOREIGN PATENT DOCUMENTS

| | | |
|---|---|---|
| CA | 1 183 883 A | 3/1985 |
| CA | 2120809 A1 | 10/1994 |
| CA | 2227197 A | 2/1997 |
| CA | 2160731 A | 4/1997 |
| CA | 2190431 A1 | 5/1998 |
| CA | 2 285 726 A1 | 7/2000 |
| CA | 2 487 888 A1 | 5/2005 |
| CA | 2461226 A1 | 9/2005 |

* cited by examiner

*Primary Examiner* — Mark Graham
(74) *Attorney, Agent, or Firm* — Womble Carlyle Sandridge & Rice, LLP

(57) ABSTRACT

A hockey stick shaft includes an elongate, rectangular tube having a length and a plurality of side walls. The plurality of side walls define an elongate inner chamber of the tube. The chamber extends along the length of the tube. The plurality of side walls includes a first side wall, a second side wall opposite the first side wall, and a pair of opposite third and fourth side walls separating the first side wall from the second side wall. A support member is positioned within the chamber and extends along the length of the tube. The support member divides the chamber, and connects the first and second side wall walls to one another.

15 Claims, 6 Drawing Sheets

HOCKEY STICK

CROSS-REFERENCE TO RELATED APPLICATION

This application is a continuation of international application number PCT/CA2011/050003, filed Jan. 8, 2011, which claims priority to Canadian Patent Application No. 2,689,868, filed Jan. 8, 2010, both of which are incorporated herein by reference in their entirety and for all purposes.

BACKGROUND OF THE INVENTION

This disclosure relates to hockey sticks and, more particularly, to hockey sticks having rectangular, hollow shafts.

Prior art handles or shafts of hockey sticks are formed of materials selected, for example, from wood, metal, such as, aluminum, fiber glass, Kevlar® oriented polyethylene, other plastics and composite materials. A hockey stick shaft typically has flat front and back faces that are relatively wider than the shaft's thickness that extends from the front face to the back face. Some hockey sticks are made having a shaft formed as a rectangular, hollow shaft. The force exerted on the hockey stick is typically the greatest when the player is hitting the puck. When the player is shooting, passing or taking a slap shot with the hockey stick, a substantial amount of force may be exerted on a lower part of the shaft. This force in many cases is greater than the stick can withstand and results in the hockey stick breaking, sometimes into several or many pieces.

There is, therefore, a need for an improved hockey stick, shaft or handle that provides a new balance of properties, such as by being more resistant to breakage while seeking to provide an optimal balance between flexibility and stiffness.

SUMMARY OF THE INVENTION

In accordance with one aspect of this disclosure, a hockey stick shaft includes an elongate, rectangular (e.g., substantially rectangular) tube having a length and a plurality of side walls, the plurality of side walls define an elongate inner chamber of the tube, the chamber extends along the length of the tube, and the plurality of side walls includes a first side wall, a second side wall opposite the first side wall, and a pair of opposite third and fourth side walls separating the first side wall from the second side wall. In accordance with this aspect, a support member is positioned within the chamber and extends along the length of the tube, the support member may be planar (e.g., substantially planar), and the support member may connect the first and second side wall walls to one another.

According to one aspect of this disclosure, there may be one or more of the support members positioned within the chamber and extending along the length of the tube, and one or more of the support members may extend parallel to (e.g., substantially parallel to) the third and fourth side walls.

In one aspect, one of the support members may be parallel to (e.g., substantially parallel to) the third and fourth side walls, and the one of the support members may connect the first and second side walls at (e.g., substantially at) their mid-points to divide the inner chamber into a first chamber (e.g., a first half-chamber) and a second chamber (e.g., a second half-chamber). Another of the support members may be a first diagonal support member within the first chamber, and yet another of the support members may be a second diagonal support member within the second chamber.

In some embodiments of this disclosure, each of the first and second side walls have a greater width than each of the third and fourth side walls. In such embodiments, the first side wall may be characterized as being the front side wall of the shaft, which defines the front face of the shaft, and the second side wall may be characterized as being the back side wall of the shaft, which defines the rear face of the shaft. In one aspect, the first diagonal member may extend within the first chamber from (e.g., from proximate) the mid-point of the first side wall to (e.g., to proximate) a first outer edge of the second side wall. Similarly, the second diagonal member may extend within the second chamber from (e.g., from proximate) the mid-point of the first side wall to (e.g., to proximate) a second outer edge of the second side wall.

In accordance with one aspect, the shaft is formed of polymeric material, such as a composite plastics material, and each of the support members is integrally formed with the first and second side walls. As one example, the shaft may be uniform (e.g., substantially uniform) along its entire length. As a more specific example, the shaft, or a portion thereof, may be an extrusion.

Another aspect of this disclosure is the provision of a dual shaft for a hockey stick. The dual shaft may include an elongate, rectangular hollow tube having side walls defining an inner chamber that contains a shaft as hereinabove described.

Other aspects of this disclosure will become apparent from the following.

BRIEF DESCRIPTION OF THE DRAWINGS

Having described some aspects of this disclosure in general terms, reference will now be made to the accompanying drawings, which illustrate exemplary embodiments of this disclosure, are not necessarily drawn to scale and may be schematic, and wherein.

DETAILED DESCRIPTION OF THE INVENTION

Referring now in greater detail to the drawings, in which like numerals refer to like parts throughout the several views, exemplary embodiments of this disclosure are described in the following. For example, FIGS. 1-4 illustrate a first embodiment of this disclosure, which is described in the following.

Figure 1:
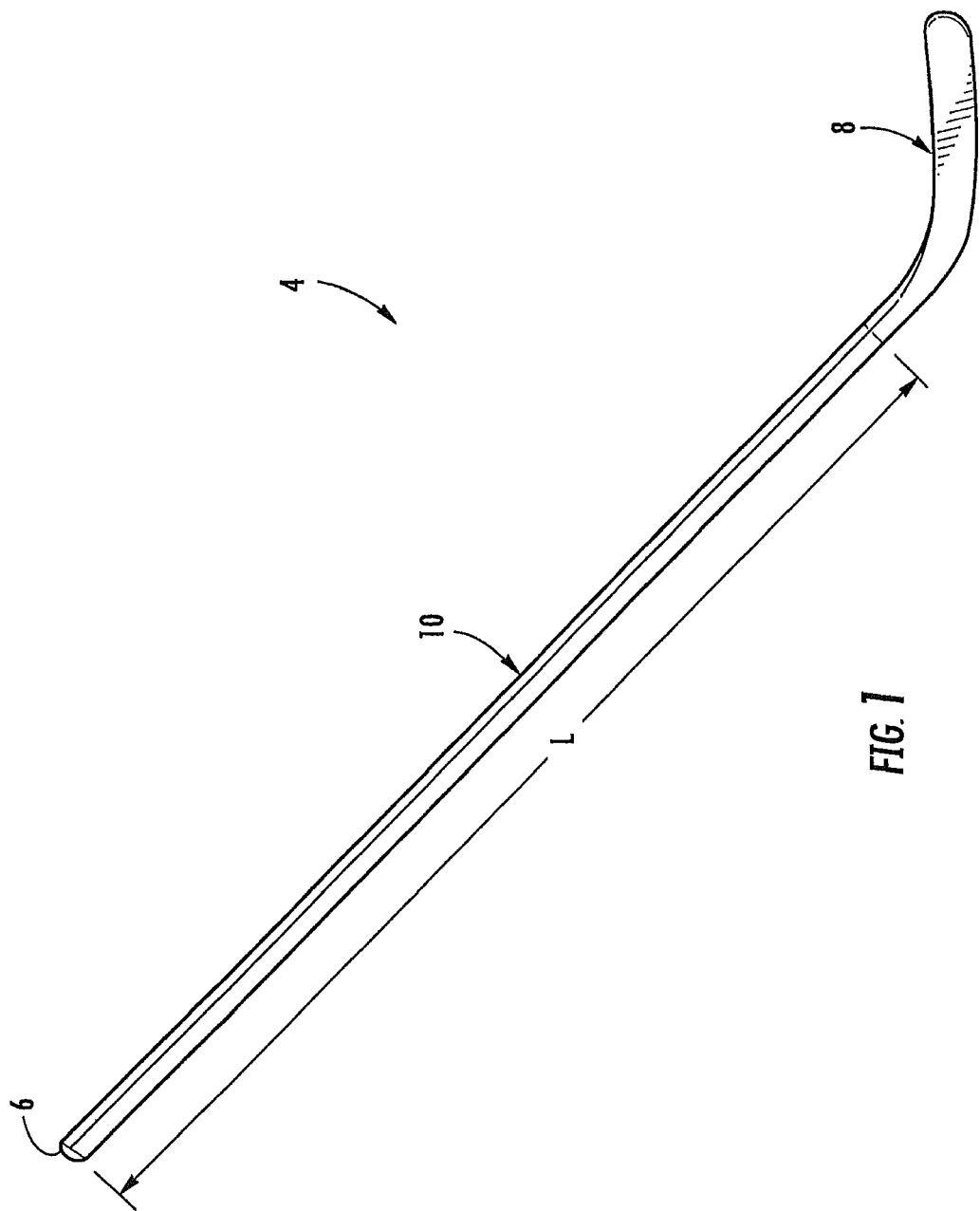
FIG. 1 is a perspective view of a hockey stick in accordance with a first embodiment of this disclosure.
Figure 2:
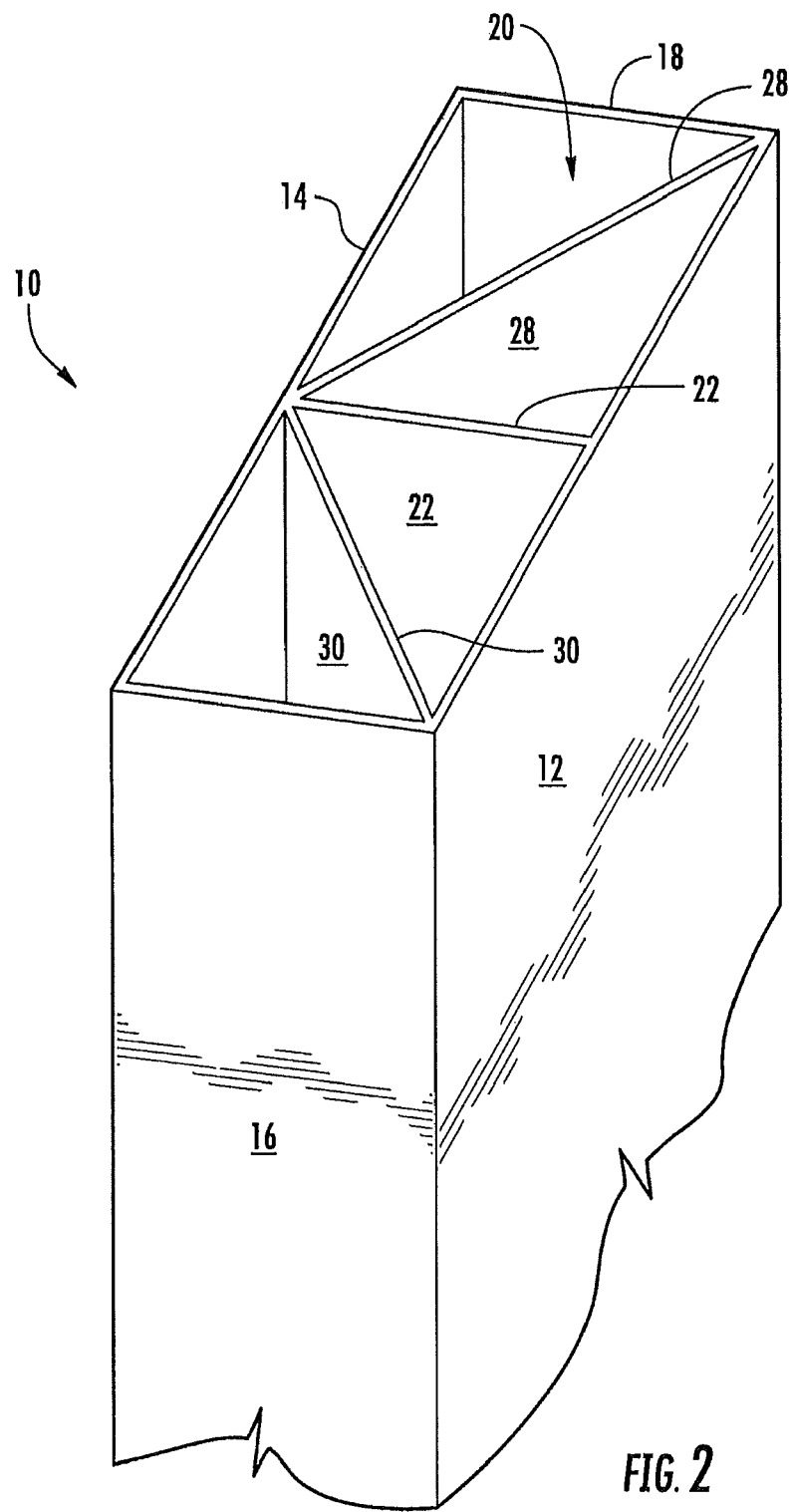
FIG. 2 is an isolated, end perspective view of portion of a shaft of the hockey stick of FIG. 1, in accordance with the first embodiment.
Figure 3:
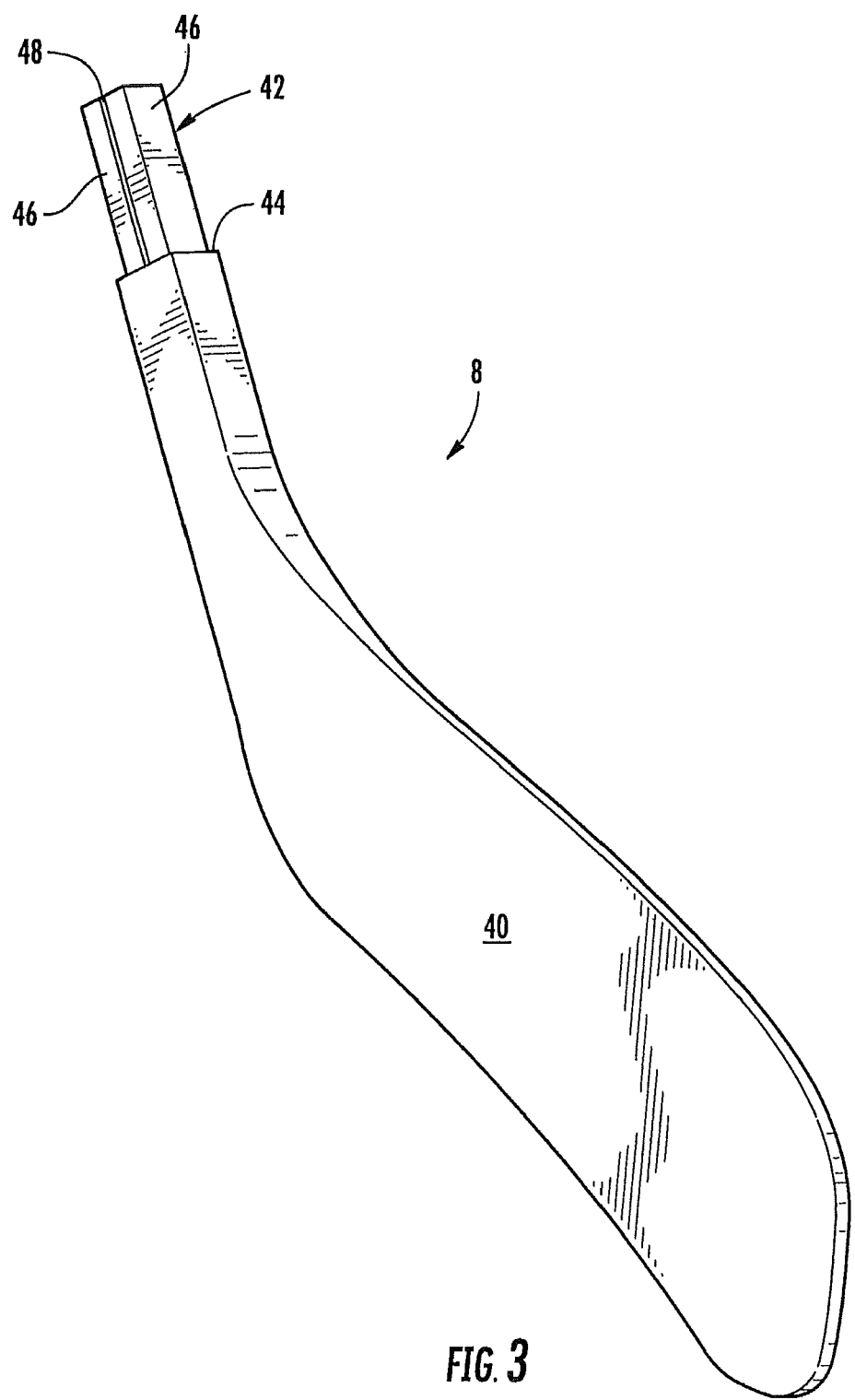
FIG. 3 is an isolated perspective view of a blade assembly of the hockey stick of FIG. 1, in accordance with the first embodiment.

Referring to FIG. 1, a hockey stick 4 of the first embodiment includes and end cap 6 and a blade assembly 8 respectively mounted to opposite ends of a shaft 10 (e.g., handle) having a length "L". Referring to FIG. 2, the shaft 10 is in the form of an elongate, rectangular, hollow tube that extends for the entire length L. The shaft 10 (e.g., tube) includes a first side wall 12, a second side wall 14 that is opposite from the first side wall, a third side wall 16, and a fourth side wall 18 that is opposite the third side wall. The third and fourth side walls 16, 18 extend between and separate the first and second side walls 12, 14 from one another. The first and second side walls 12, 14 each have a greater width than the third and fourth side walls 16, 18.

The side walls 12, 14, 16, 18 define (e.g., at least partially define) an overall inner chamber 20 of the shaft 10. The shaft 10 further includes one or more support members (e.g., central and diagonal support members 22, 28, 30) that are within and at least partially define (e.g., subdivide) the overall inner chamber 20. In accordance with one aspect of this disclosure, the side walls 12, 14, 16, 18 and the one or more support members 22, 28, 30 are cooperatively configured to provide an optimal balance between, for example, flexibility and stiffness of the hockey stick 4/the shaft 10. Those of ordinary skill in the art will understand that a variety of cooperative configurations, for providing a variety of different flexibilities and stiffnesses, are within the scope of this disclosure.

Opposite ends of the central support member 22 are respectively positioned midway (e.g., substantially midway) along, and integrally formed with, the first and second walls 12, 14. As a result, the central support member 22 divides the overall chamber 20 into two chambers (e.g., first and second half-chambers). The diagonal support members 28, 30 respectively divide each of the half-chambers into two chambers. Convergent ends of the diagonal support members 28, 30 are integrally formed with one another, the mid-point of the of the second side wall 14, and the respective end of the central support member 22. Divergent ends of the diagonal support members 28, 30 are respectively integrally formed with opposite edges of the first side wall 12. The divergent ends of the diagonal support members 28, 30 may also be integrally formed with respective edges of the third and fourth side walls 16, 18.

In accordance with the first embodiment and apparent from the forgoing, the overall chamber 20 may be characterized as including four portions that each extend for the entire (e.g., substantially the entire) length L of the shaft 10. On the other hand, the shaft may be characterized as including four chambers that each extend for the entire (e.g., substantially the entire) length L of the shaft 10. Those of ordinary skill in the art will understand that different numbers and arrangements of chambers/chamber portions are within the scope of this disclosure.

Figure 4:
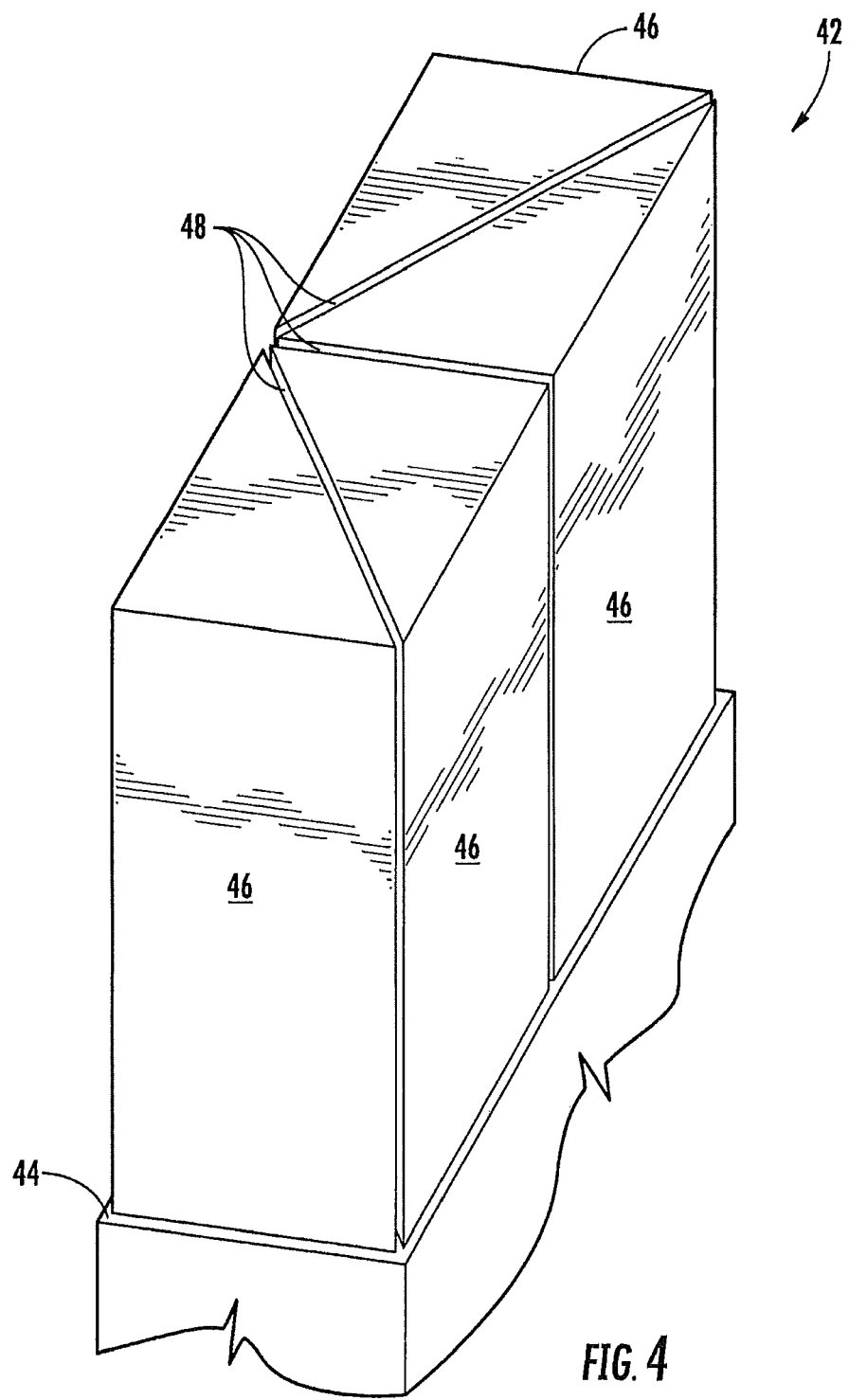
FIG. 4 is an isolated, end perspective view of portion of the blade assembly of FIG. 3, in accordance with the first embodiment.

The first side wall 12 may be characterized as being part of the back side, and partially defining the back face, of the hockey stick 4. Accordingly, the second side wall 14 may be characterized as being part of the front side, and partially defining the front face, of the hockey stick 4. In this regard and as best understood with reference to FIG. 3, the blade assembly 8 typically has a blade with a concave side 40 that also partially defines the front face of the hockey stick 4. Referring also to FIG. 4, the blade assembly 8 further includes a compound tenon 42 that extends away from a rectangular (e.g., substantially rectangular) shoulder 44 that extends around an end of the compound tenon. The compound tenon 42 includes projections 46 that are respectively at least partially defined by (e.g., separated by) apertures, namely planar (e.g., substantially planar) slots 48.

As one example, the blade assembly 8 may be formed from a conventional blade assembly made of wood and/or any other suitable material(s), by cutting the slots 48 into the tenon of the conventional blade assembly. Alternatively, the blade assembly 8 may constructed in any other suitable manner.

In accordance with the first embodiment, each of the projections 46 and slots 48 extend for the entire length of the compound tenon 42, and the compound tenon is uniform (e.g., substantially uniform) along its entire length; and as mentioned previously, the shaft 10 is uniform along its entire length. In cross sections taken perpendicular to the lengths, the configurations of the projections 46 respectively correspond to (e.g., substantially correspond to) the configurations of the portions of the chamber 20, and the configurations of the slots 48 respectively correspond to (e.g., substantially correspond to) the configurations of the support members 22, 28, 30.

In accordance with the first embodiment, the blade assembly 8 is mounted to the lower end of the shaft 10 by inserting the free end of the compound tenon 42 into the lower end of the chamber 20 so that the projections 46 are respectively received in the portions of the chamber 20, and the support members 22, 28, 30 are respectively received in the slots 48. During the mounting, the relative movement between the shaft 10 and the blade assembly 8 is typically arrested when the shoulder 44 abuts the lower end faces of the side walls 12, 14, 16, 18.

The configurations of the projections 46 and the portions of the chamber 20 are typically such that there is an interference fit/press fit/friction fit, or the like, respectively therebetween; the configurations of the support members 22, 28, 30 and the slots 48 are typically such that there is an interference fit/press fit/friction fit, or the like, respectively therebetween; and/or adhesive material or other fastening techniques may be employed in the mounting of the blade assembly 8 to the shaft 10. The cap 6 may also include a compound tenon like the compound tenon 42 of the blade assembly 8, so that the cap may be mounted to the shaft 10 in substantially the same manner as the blade assembly.

In accordance with a first version of the first embodiment, each of the walls 12, 14, 16, 18 and support members 22, 28, 30 is planar (e.g., substantially planar), extends for the entire (e.g., substantially the entire) length L of the shaft 10, and is an integrally formed component of the shaft 10; and the shaft is uniform (e.g., substantially uniform) along its entire length L. For example and in accordance with the first version of the first embodiment, the shaft 10 may be a single extrusion (e.g., an extruded tube) that is formed through a single die. The shaft 10 may be extruded from any suitable materials such as, but not limited to, polymeric material(s) (e.g., composite plastic) or metallic material(s). Notwithstanding, those of ordinary skill will understand that a variety of differently configured wall(s), differently configured support member(s), different manufacturing methods and/or different materials of construction are within the scope of this disclosure.

A second version of the first embodiment is like the first version of the first embodiment, except for variations noted and variations that will be apparent to one of ordinary skill in the art. In accordance with the second version of the first embodiment, the support members 22, 28, 30 may be made separately from a tubular structure consisting of consisting essentially of, or comprising the side walls 12, 14, 16, 18 ("the tubular structure"), and then the support members 22, 28, 30 may be mounted within the chamber of the tubular structure. For example, the support members 22, 28, 30 may be inserted into the chamber of the tubular structure, and then the support members may be attached to the interior surface of the tubular structure with adhesive material or other fastening techniques. The support members 22, 28, 30 may together be a single extrusion that is formed through a single die. Alternatively, the support members 22, 28, 30 may be separately formed from one another, and thereafter joined to one another with adhesive material or other fastening techniques.

Figure 5:
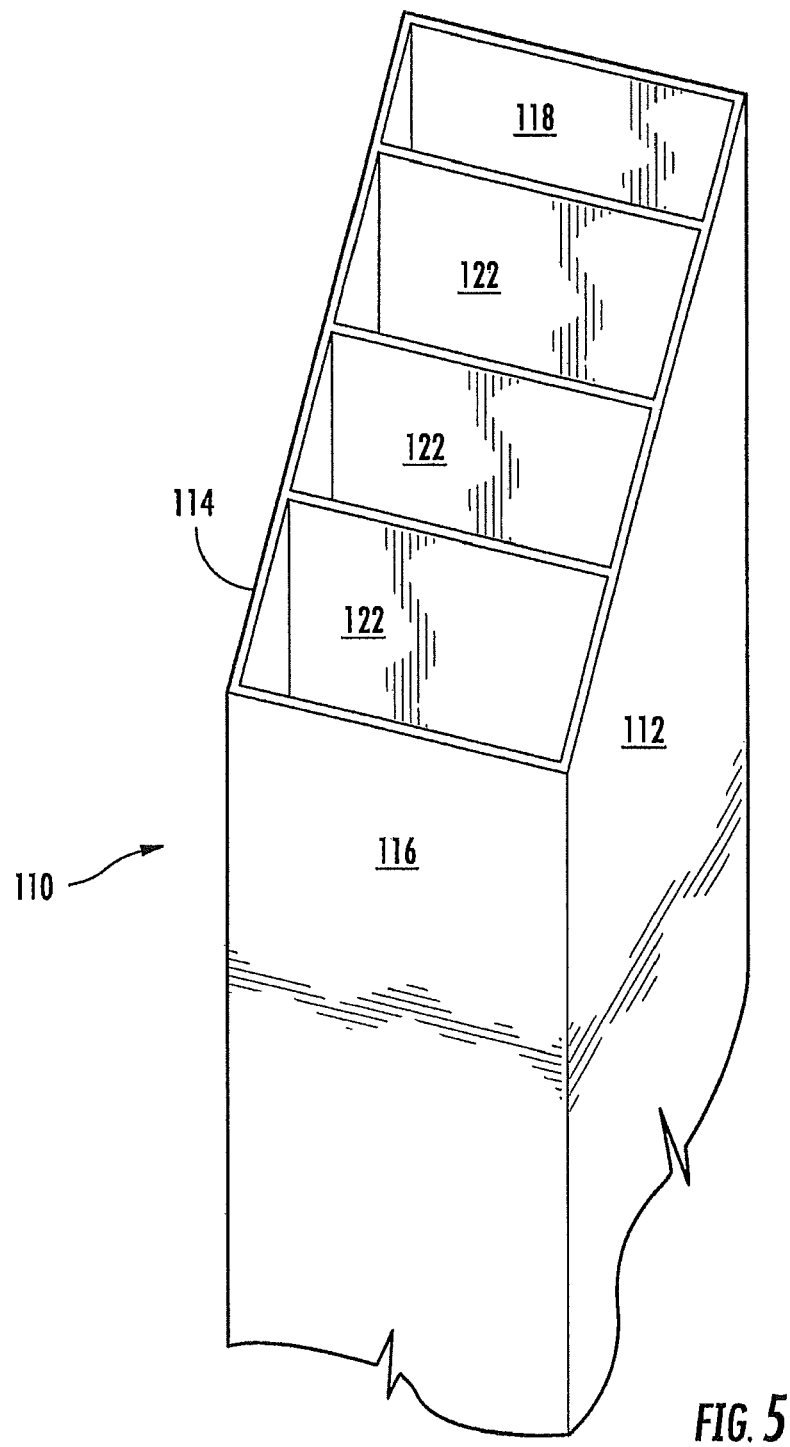
FIG. 5 is an isolated, end perspective view of portion of a shaft of a hockey stick, in accordance with a second embodiment of this disclosure.

A second embodiment of this disclosure is like the first embodiment of this disclosure, except for variations noted and variations that will be apparent to one of ordinary skill in the art. Due to the similarity, components of the second embodiment that are identical and/or function in at least some ways similarly to corresponding components of the first embodiment have reference numbers incremented by one hundred. FIG. 5 is like FIG. 2 except for illustrating that, in a hockey stick shaft 110 of the second embodiment, there is an array of integrally formed, planar (e.g., substantially planar) support members 122 that are each parallel (e.g., substantially parallel) to the side walls 116, 118 that separate the wider side walls 112, 114 from one another. The side walls 112, 114 may be considered to be either the front or back of the hockey stick, or vice versa, depending on the orientation of the blade.

Figure 6:
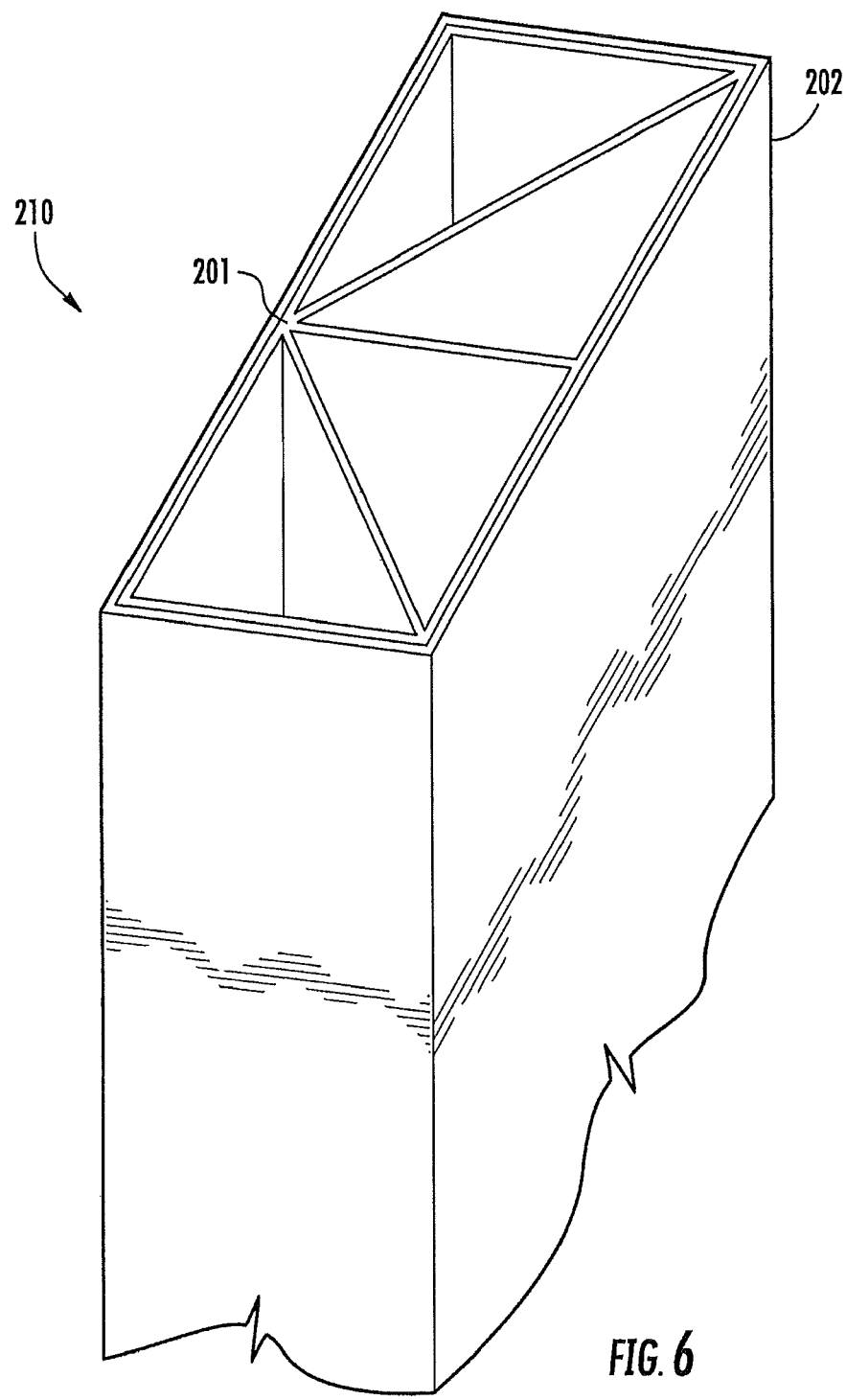
FIG. 6 is a schematic, isolated, end perspective view of portion of a shaft of a hockey stick, in accordance with a third embodiment of this disclosure.

A third embodiment of this disclosure is like the first and second embodiments, except for variations noted and variations that will be apparent to one of ordinary skill in the art. FIG. 6 is generally similar to FIGS. 2 and 5, and schematically illustrates a hockey stick shaft 210 of the third embodiment. The hockey stick shaft 210 includes an inner tube 201 mounted within a chamber of an outer tube 202. The inner tube 201 may be like (e.g., substantially like) either of the shafts 10, 110 of the first and second embodiments, or the like, and the outer tube 202 may extend for the entire length (e.g., substantially the entire length) of the inner tube. The outer tube 202 is elongate, substantially rectangular, and has a plurality of side walls that extends around (e.g., at least partially around) the chamber of the outer tube. For example, the outer tube 202 may be a single extrusion (e.g., an extruded tube) that is formed through a single die. The outer tube 202 may be extruded from any suitable materials such as, but not limited to, polymeric material(s) or metallic material(s).

It will be understood by those skilled in the art that while the present disclosure has been discussed above with reference to exemplary embodiments, various additions, modifications and changes can be made thereto without departing from the spirit and scope of the invention as set forth in the claims.

What is claimed is:
1. A hockey stick shaft comprising:
an elongate, substantially rectangular tube having a length and a plurality of side walls, the plurality of side walls at least partially defining an elongate inner chamber of the tube, the chamber extending along the length of the tube, and the plurality of side walls including
a first side wall,
a second side wall opposite the first side wall, and
a pair of opposite third and fourth side walls separating the first side wall from the second side wall, wherein the second side wall includes opposite first and second edges respectively connected to an edge of the third side wall and an edge of the fourth side wall;
a support member positioned within the chamber and extending along the length of the tube, the support member being substantially planar, and the support member connecting the first and second side walls to one another about respective mid-points thereof, wherein the support member is substantially parallel to the third and fourth side walls;
a first diagonal support member extending from the first edge of the second side wall to proximate the mid-point of the first side wall; and a second diagonal support member extending from the second edge of the second side wall to proximate the mid-point of the first side wall.
2. A shaft as claimed in claim 1, wherein the first diagonal support member and the second diagonal support member extend at least partially along the length of the tube.
3. A shaft as claimed in claim 1, wherein the support member extends from proximate the mid-point of the first side wall to proximate the mid-point of the second side wall to substantially divide the inner chamber into a first half chamber and a second half chamber.
4. A shaft as claimed in claim 3, wherein the first diagonal support member is positioned within the first half chamber.
5. A shaft as claimed in claim 3, wherein the second diagonal support member is positioned within the second half chamber.
6. A shaft as claimed in claim 1, wherein each of the first side wall and the second side wall has a greater width than each of the third side wall and the fourth side wall.
7. A shaft as claimed in claim 1 wherein the support member is integrally formed with each of the first and second side walls.
8. A shaft as claimed in claim 1, wherein:
the tube is a first tube;
the shaft further comprises a second tube that is elongate, substantially rectangular and hollow, and the second tube has a plurality of side walls that extends at least partially around an elongate inner chamber of the second tube; and
the first tube is positioned in the inner chamber of the second tube.
9. A shaft as claimed in claim 1 in combination with a blade, wherein the blade is mounted to an end of the shaft, so that the combination of the shaft and the blade is a hockey stick.
10. A hockey stick, comprising:
an elongate substantially rectangular tube having a length and a plurality of side walls, the plurality of side walls at least partially defining an elongate inner chamber of the tube, and the chamber extending along the length of the tube, and the plurality of side walls including
a first side wall,
a second side wall opposite the first side wall, and
a pair of opposite third and fourth side walls separating the first side wall from the second side wall, wherein the second side wall includes opposite first and second edges respectively connected to an edge of the third side wall and an edge of the fourth side wall;
a support member positioned within the chamber, the support member extending along the length of the tube, and the support member extending between the first and second side walls of the plurality of side walls, about respective mid-points thereof, so that the support member divides the chamber into a plurality of portions of the chamber, wherein each of the chamber and the support member extends along substantially all of the length of the tube;
a first diagonal support member extending from the first edge of the second side wall to proximate the mid-point of the first side wall; and
a second diagonal support member extending from the second edge of the second side wall to proximate the mid-point of the first side wall; and
a blade assembly mounted to an end of the tube.
11. A hockey stick as claimed in claim 10, wherein at least one of the tube and the support member is an extrusion.

12. A hockey stick as claimed in claim 10, wherein:
the blade assembly includes an end having first and second projections, and a slot is defined between the first and second projections;
the first projection is positioned in a first portion of the plurality of portions of the chamber;
the second projection is positioned in a second portion of the plurality of portions of the chamber; and
an end of the support member is positioned in the slot.

13. A method of making a hockey stick, comprising:
extruding a tube, the extruded tube including
a plurality of side walls, the plurality of side walls at least partially defining an elongate inner chamber of the tube, and the chamber extending along a length of the tube,
a support member positioned within the chamber, the support member extending along the length of the tube, and the support member extending between two side walls of the plurality of side walls, about respective mid-points thereof, so that the support member divides the chamber into a first portion and a second portion,
a first diagonal support member in the first portion of the chamber, and
a second diagonal support member in the second portion of the chamber,
wherein the first diagonal support member and the second diagonal support member intersect the support member at the midpoint of one of the side walls; and
mounting a blade assembly to an end of the tube, the blade assembly including an end having first and second projections, a slot being defined between the first and second projections, and the mounting of the blade assembly to the end of the tube including
inserting the first projection into the first portion of the chamber,
inserting the second projection into the second portion of the chamber, and
inserting an end of the support member into the slot.

14. A method as claimed in claim 13, wherein the inserting steps are performed substantially simultaneously.

15. A method of making a hockey stick, comprising:
having a tube including a plurality of side walls, the plurality of side walls at least partially defining an elongate inner chamber of the tube, and the chamber extending along a length of the tube, and
mounting a support member within the chamber so that the support member extends along the length of the tube, and the support member extends between two side walls of the plurality of side walls, about respective mid-points thereof, so that the support member divides the chamber into a first portion and a second portion;
mounting a first diagonal support member in the first portion of the chamber;
mounting a second diagonal support member in the second portion of the chamber,
wherein the first diagonal support member and the second diagonal support member intersect the support member at the midpoint of one of the side walls; and
mounting a blade assembly to an end of the tube, the blade assembly including an end having first and second projections, a slot being defined between the first and second projections, and the mounting of the blade assembly to the end of the tube including
inserting the first projection into the first portion of the chamber,
inserting the second projection into the second portion of the chamber, and
inserting an end of the support member into the slot.

* * * * *

UNITED STATES PATENT AND TRADEMARK OFFICE
CERTIFICATE OF CORRECTION

| | | |
|---|---|---|
| PATENT NO. | : 8,439,776 B2 | Page 1 of 1 |
| APPLICATION NO. | : 13/536812 | |
| DATED | : May 14, 2013 | |
| INVENTOR(S) | : Daniel Baroux | |

It is certified that error appears in the above-identified patent and that said Letters Patent is hereby corrected as shown below:

On the Title Page, the foreign priority information has been omitted. Please add the "Related Foreign Application Data" section as follows:

Item (30) Related Foreign Application Data

Canadian Application No. 2,689,868, filed on January 8, 2010

Signed and Sealed this
Sixth Day of August, 2013

Teresa Stanek Rea
*Acting Director of the United States Patent and Trademark Office*